United States Patent [19]

Valint, Jr. et al.

[11] Patent Number: 4,492,785

[45] Date of Patent: Jan. 8, 1985

[54] WATER SOLUBLE BLOCK POLYMERS

[75] Inventors: Paul L. Valint, Jr., Asbury; Jan Bock, Bridgewater, both of N.J.

[73] Assignee: Exxon Research and Engineering Co., Florham Park, N.J.

[21] Appl. No.: 454,243

[22] Filed: Dec. 29, 1982

[51] Int. Cl.³ .............................................. C08L 51/00
[52] U.S. Cl. ................................... 524/529; 525/271; 525/314
[58] Field of Search ............................ 525/271, 333.5; 524/529; 523/314

[56] References Cited

U.S. PATENT DOCUMENTS

| | | | |
|---|---|---|---|
| 3,231,635 | 1/1966 | Holden et al. | 525/271 |
| 3,925,280 | 12/1975 | Lundberg et al. | 525/504 |

*Primary Examiner*—Jacob Ziegler
*Attorney, Agent, or Firm*—Richard E. Nanfeldt

[57] ABSTRACT

The present invention relates to viscosification agents for water which are diblock polymers of t-butylstyrene/metal styrene sulfonate and triblock polymers of t-butylstyrene/metal styrene sulfonate/t-butylstyrene.

8 Claims, 7 Drawing Figures t-BUTYLSTYRENE-STYRENE DIBLOCK POLYMER SYNTHESIS t-BUTYLSTYRENE-STYRENE-t-BUTYLSTYRENE TRIBLOCK POLYMER SYNTHESIS

SULFONATION OF t-BUTYLSTYRENE-STYRENE BLOCK POLYMERS

WATER SOLUBLE BLOCK POLYMERS

FIELD OF THE INVENTION

The present invention relates to viscosification agents for aqueous solution in which the viscosification agents are diblock polymers of t-butylstyrene/metal styrene sulfonate and triblock polymers of t-butylstyrene/metal styrene sulfonate/t-butylstyrene.

BACKGROUND OF THE INVENTION

The present invention discloses a class of water soluble block polymers of relatively low molecular weight, which have been found to efficiently viscosify water. These polymers have a water soluble block and a hydrocarbon soluble block. For aqueous solubility, the water soluble block is greater than 80 weight percent of the total polymer. One method of preparing the block polymers is to anionically polymerize a hydrocarbon soluble block polymer. This is followed by the selective functionalization of the major block to render said block water soluble. The functionalization in this invention is sulfonation followed by neutralization of the resulting sulfonic acid. These block polymers readily dissolve in water. The resulting solutions exhibit enhanced viscosity at low concentrations (i.e., 500 to 1500 ppm) relative to solutions of homopolymers of even higher molecular weight. They also have viscosity levels significantly greater than corresponding random copolymer solutions of similar composition.

Numerous U.S. Patents have taught methods of sulfonating a variety of elastomeric and thermoplastic polymers. These U.S. Pat. Nos. are: 3,642,728; 3,836,511; 3,072,618; 3,072,619; 3,847,854; 3,870,841 and 3,887,530. However, none of these references teach the process for preparing the sulfonated diblock and triblock polymers of the instant invention, nor do they recognize that sulfonated polymers of this class are excellent viscosification agents for aqueous solutions.

SUMMARY OF THE INVENTION

The present invention relates to a process for the formation of water soluble sulfonated triblock polymers of t-butylstyrene/metal styrene sulfonate/t-butylstyrene, and water soluble diblock polymers of t-butylstyrene/metal styrene sulfonate, wherein the diblock polymers of t-butylstyrene/styrene or the triblock polymers of t-butylstyrene/styrene/t-butylstyrene are formed by an anionic polymerization process and the formed diblock or triblock polymer is selectively sulfonated on the styrene blocks. The diblock polymers of t-butylstyrene/metal styrene sulfonate or the triblock polymers of t-butylstyrene/metal styrene sulfonate/t-butylstyrene are excellent viscosification agents for aqueous solutions.

GENERAL DESCRIPTION OF THE INVENTION

The water soluble diblock polymers of t-butylstyrene/metal styrene sulfonate, triblock polymers of t-butylstyrene/metal styrene sulfonate/t-butylstyrene are formed by the selective sulfonation of the styrene block of the diblock polymer of t-butylstyrene/styrene or triblock polymer of t-butylstyrene styrene/t-butylstyrene. These diblock or triblock polymers are formed by the anionic polymerization of styrene monomer and t-butylstyrene. The process of forming the diblock copolymers of t-butylstyrene/styrene and the triblock polymers of t-butyl styrene/styrene/t-butylstyrene is based on a synthetic reaction sequence to form the block polymers of t-butylstyrene-b-styrene sulfonate by means of an anionic polymerization of t-butylstyrene followed by the addition of styrene monomer to continue polymerization on the living anion polymer. All polymerizations were initiated with sec-butyl lithium to form the t-butylstyrene anion. Additional t-butylstyrene was added for the desired chain length of that block followed by the addition of styrene only for diblock polymer preparation. Chain termination was accomplished by the addition of an alcohol to the reaction mixture to protonate the chain and anionic functionality. The overall reaction sequence for the diblock polymer synthesis is illustrated in FIG. 1.

The preparation of triblock polymer with end blocks of t-butylstyrene was done sequentially, again, starting with initiation of t-butylstyrene polymerization by sec-butyl lithium. After addition of styrene to form the midblock, t-butylstyrene monomer was again added to the living polymer chain to complete the triblock polymer synthesis as schematically presented in FIG. 2.

The present polymerization process for preparing the diblock polymers of t-butylstyrene/styrene comprises the steps of forming a t-butylstyrene anion by initiation of t-butylstyrene monomer with sec-butyl lithium; adding additional t-butylstyrene to t-butylstyrene anion to obtain the desired chain length of the t-butylstyrene block; adding styrene to the living anion polymer of t-butylstyrene until the desired chain length of the styrene block has been achieved; and terminating the polymerization by the addition of alcohol.

The polymerization process for preparing the triblock polymers of t-butylstyrene/styrene/t-butylstyrene comprises the additional steps of adding additional t-butylstyrene to the living anion of the t-butylstyrene/styrene polymer prior to chain termination by an alcohol.

The diblock polymers of t-butylstyrene/styrene are represented by the formula:

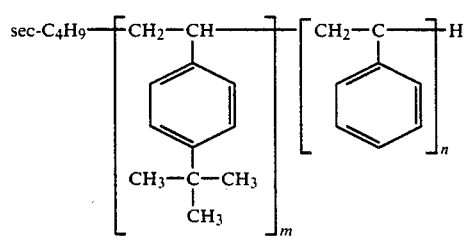

wherein m is about 0.5 to about 15.0 mole %, more preferably about 1.0 to about 12.0 mole %, and most preferably about 2.0 to about 12.0 mole %, and n is about 85.0 to about 99.5 mole %, more preferably about 88.0 to about 99.0 mole %, and most preferably about 88.0 to about 98.0 mole %. The molecular weight, as determined by gel permeation chromatography, for these diblock polymers of t-butylstyrene/styrene is about 100,000 to about 3,000,000, more preferably about 200,000 to about 2,000,000 and most preferably about 400,000 to about 1,000,000.

The triblock polymers of t-butylstyrene/styrene/t-butylstyrene are represented by the formula:

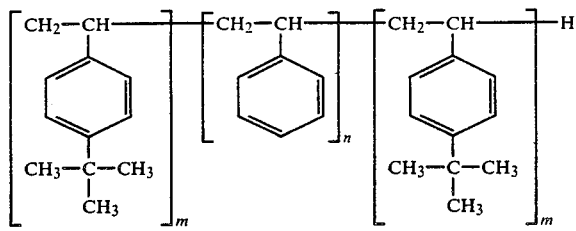

wherein m is about 0.25 to about 7.5 mole %, more preferably about 0.5 to about 6.0 mole %, and most preferably about 1.0 to about 6.0 mole %, and n is about 85.0 to about 99.5 mole %, more preferably about 88.0 to about 99.0 mole %, and most preferably about 88.0 to about 98.0 mole %. The molecular weight, as determined by gel permeation chromotography, for these triblock polymers of t-butylstyrene/styrene/t-butylstyrene is about 100,000 to about 3,000,000 more preferably about 200,000 to about 2,000,000 and most preferably about 400,000 to about 1,000,000.

The diblock polymers of t-butylstyrene/styrene or the triblock polymers of t-butylstyrene/styrene/t-butylstyrene are sulfonated according to schematic sequence as illustrated in FIG. 3.

In carrying out the invention, the polymer is dissolved in a non-reactive solvent such as a chlorinated aliphatic hydrocarbon, or chlorinated aromatic such as dichlorethane. A sulfonating agent is added to the solution of the polymer and non-reactive solvent at a temperature of about $-100°$ C. to about $100°$ C. for a period of time of about 1 to about 60 minutes, most preferably at $0°$ C. for about 5 to about 45 minutes; and most preferably about 15 to about 30. Typical sulfonating agents are described in U.S. Pat. No. 3,642,728, incorporated herein by reference. These sulfonating agents are a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for this invention is a complex of $SO_3$ with triethylphosphate.

Neutralization of the acid form of the diblock or triblock polymer is done by the addition of a solution of a basic material to a solution of the unneutralized, sulfonated diblock or triblock polymer. Suitable neutralizing agents are selected from metal hydroxides, metal acetates or metal alkoxides, wherein the metal cation is selected from the group consisting of iron, aluminum, lead, Groups IA, IB, IIA and IIB of the Periodic Table of Elements, wherein the sodium ion is preferred. The preferred neutralizing agents are an aqueous solution of sodium hydroxide or a solution of sodium methoxide in methanol.

DESCRIPTION OF THE PREFERRED EMBODIMENTS

The following examples illustrate the present invention without, however, limiting the same hereto.

EXAMPLE 1

Preparation of Hydrocarbon Soluble Block Prepolymers

Figure 1:
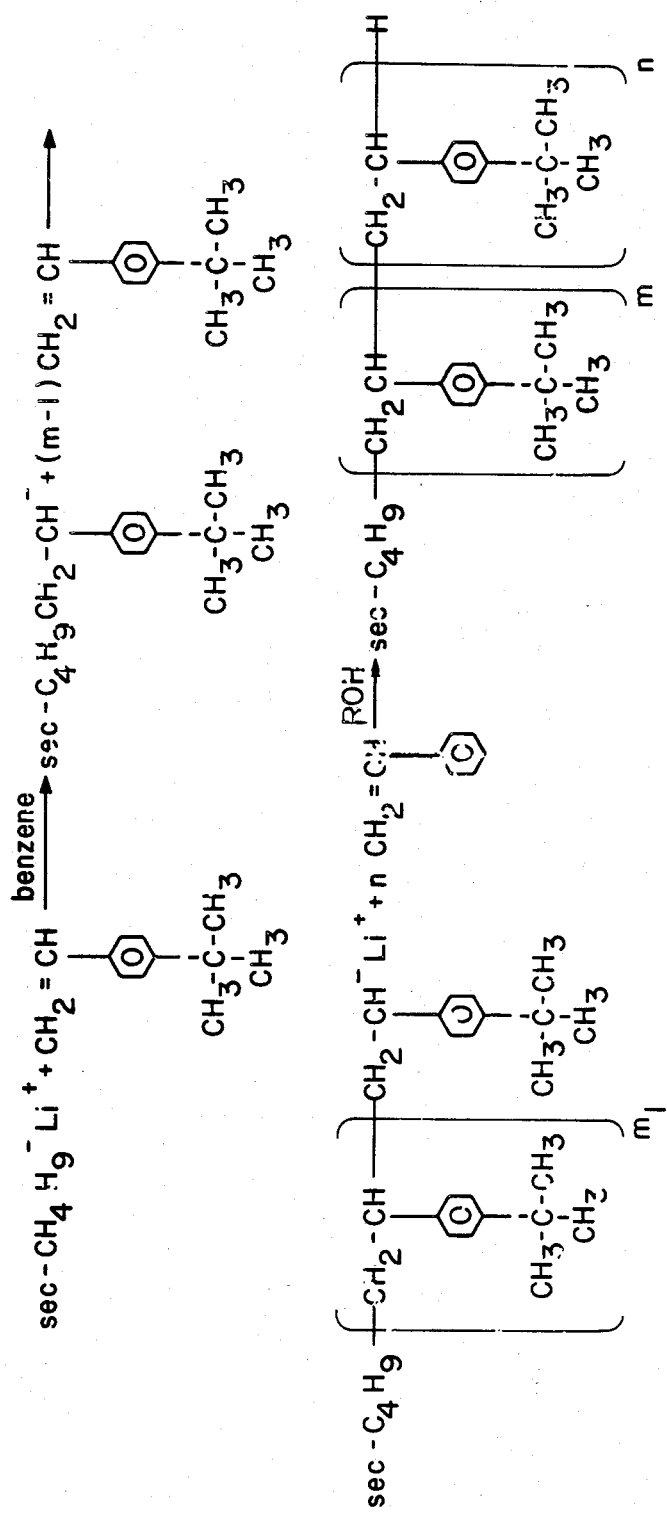
FIG. 1 illustrates a schematic of the preparation of a diblock polymer of t-butylstyrene/styrene.

The synthetic reaction sequence to the block polymers of t-butylstyrene-b-styrene sulfonate began with the anionic polymerization of t-butylstyrene followed by the addition of styrene monomer to continue polymerization on the living anion polymer. All polymerizations were initiated with sec-butyl lithium to form the t-butylstyrene anion. Additional t-butylstyrene was added for the desired chain length of that block followed by the addition of styrene only for diblock polymer preparation. Chain termination was accomplished by the addition of an alcohol to the reaction mixture to protonate the chain and anionic functionality. The overall reaction sequence for the diblock polymer synthesis is presented in FIG. 1.

Figure 2:
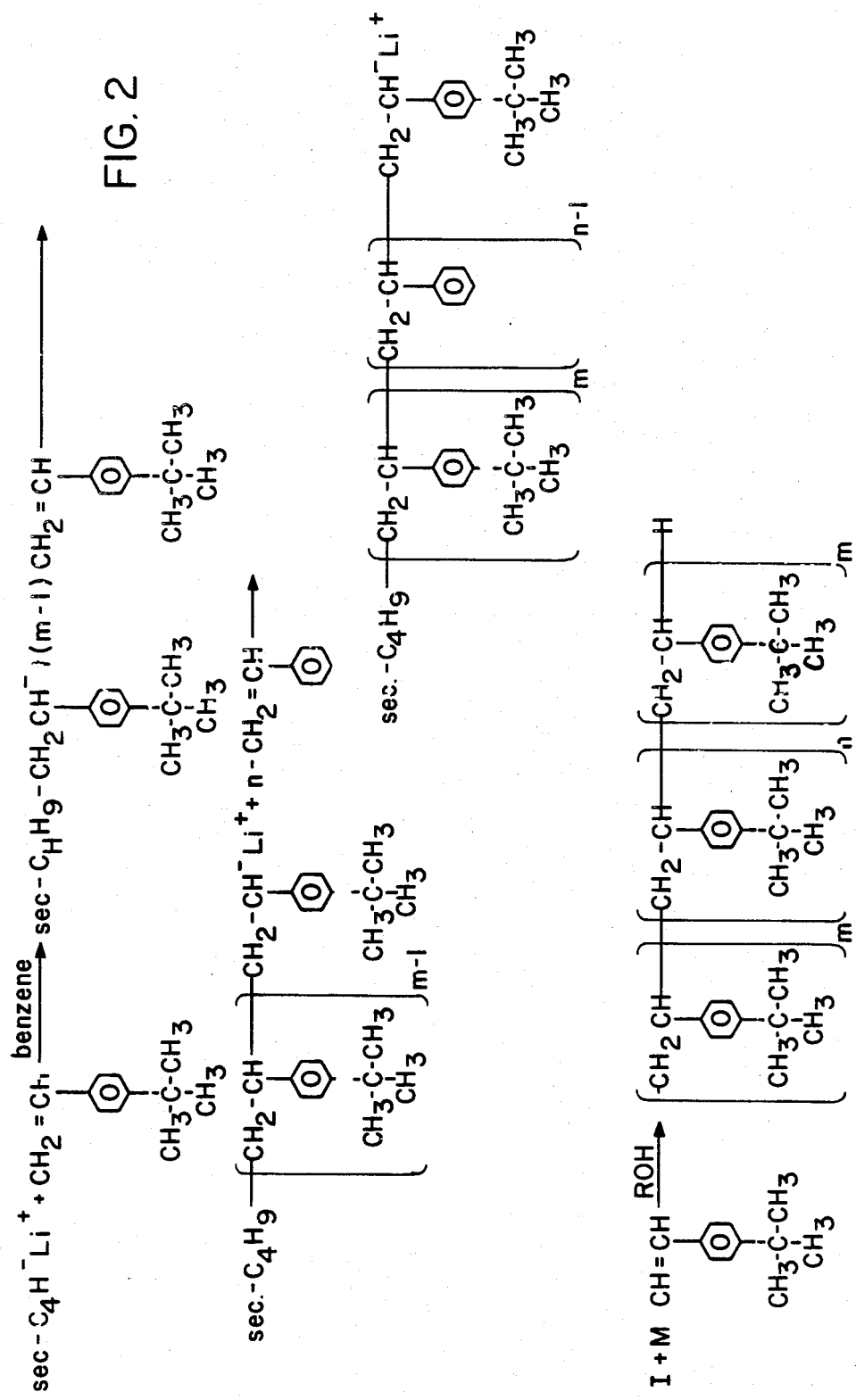
FIG. 2 illustrates a schematic of the preparation of a triblock polymer of t-butylstyrene/styrene/t-butylstyrene.

The preparation of triblock polymer with end blocks of t-butylstyrene was done sequentially, again, starting with initiation of t-butylstyrene polymerization by sec-butyl lithium. After addition of styrene to form the midblock, t-butylstyrene monomer was again added to the living polymer chain to complete the triblock polymer synthesis as schematically presented in FIG. 2.

A number of block polymers were prepared and the compositional data are presented in Table I. The diblock polymer at 11 weight % t-butylstyrene-89 weight % styrene (D11-TBS-S) had a weight average molecular weight of $4.7 \times 10^5$. The triblock polymer of composition, 2.5 weight % t-butylstyrene—95 weight % styrene—2.5 weight % t-butylstyrene had a weight average molecular weight approximately 20% higher than the diblock polymer at $6.1 \times 10^5$.

The compositional data for five diblock polymers, all at a composition of 5 weight % t-butylstyrene—95 weight % styrene, are also presented in Table I. Their molecular weights covered a range from 140,000 to 1,000,000. Random polymers of 5 and 10 weight % t-butylstyrene content were also prepared with molecular weights of 480,000 and 500,000 respectively. All of the molecular weights were determined by gel permeation chromatography (GPC) techniques.

EXAMPLE 2

Preparation of Poly(t-butylstyrene-b-styrene)

In a vacuum system, 900 ml. of dry benzene was distilled over styryl lithium directly into a reactor. Sec-butyl lithium, 0.0128 g., was added to the benzene followed by 5.0 g. of t-butylstyrene. The mixture was stirred at ambient temperature for 12 hours after which 95 g. of styrene was added and the mixture was stirred at ambient temperature for 24 hours. The polymerization was terminated by the addition of a few drops of degassed methanol. The resulting polymer was isolated by freeze-drying to remove the benzene solvent. The resulting polymer was determined to have a weight average molecular weight of 520,000 by gel permeation chromatography.

EXAMPLE 3

Sulfonation of Block Prepolymers

Figure 3:
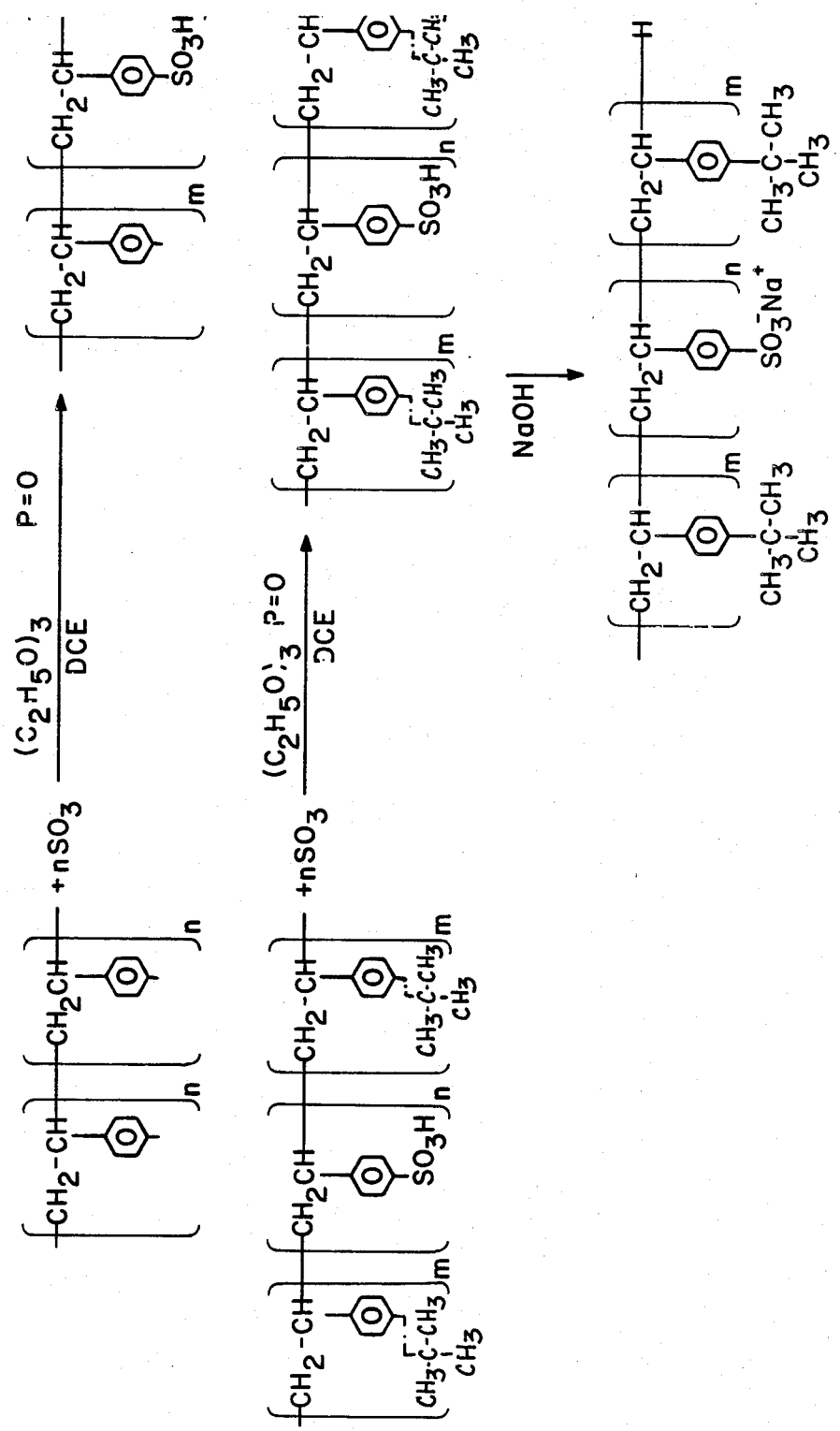
FIG. 3 illustrates a schematic of the preparation of a diblock polymer of t-butylstyrene/metal styrene sulfonate and a triblock polymer of t-butylstyrene/metal styrene sulfonate/t-butylstyrene.

The sulfonation techniques, shown in FIG. 3, for the preparation of all the water soluble sulfonate polymers utilized sulfur trioxide ($SO_3$) complexed with triethyl phosphate (TEP) as the sulfonating agent. The solvent medium was dichloroethane (DCE) chosen because the t-butylstyrene-styrene polymers were soluble, whereas the sulfonated polymers were insoluble in this solvent. This combination of solubility properties allowed for facile isolation of the desired sulfonated polymer that underwent little, if any, cross-linking. With more potent sulfonating agents, such as uncomplexed $SO_3$, cross-linking via sulfone functionality can be a serious consequence resulting in insoluble gel-like polymers. In the sulfonation of the block polymers, only the styrene block was sulfonated, since the preferred para positions of the t-butylstyrene block were already occupied. Also the steric bulk of the t-butyl group effectively inhibits sulfonation of the remaining positions on the substituted aromatic ring. Therefore, after neutralization of the styrene sulfonic acid block to the sodium salt, the polymers then consisted of a hydrophobic block, t-butylstyrene, and a hydrophilic block, sodium styrene sulfonate.

The general sulfonation procedure was to place 0.2 equivalent of triethylphosphate (TEP) dissolved in dichloroethane (DCE) (2 g TEP/100 ml DCE) into a dry reactor fitted with mechanical stirrer, two dropping funnels and thermometer. The solution was cooled to 0° C. and 1.0 eq. of block polymer dissolved in DCE (5 g polymer/100 ml DCE) was placed in a dropping funnel and 1.1 eq. of $SO_3$ in DCE in the other dropping funnel. The $SO_3$ solution followed by polymer solution were added alternately in 10% portions to the reactor while maintaining the temperature at 0° C. The sulfonated polymer precipitated from solution and was isolated by filtration and washed with pentane. The white, granular polymer was then dried under vacuum at room temperature.

The sodium salts of the sulfonated block polymers were prepared by neutralization of the free acid polymers in methanol with aqueous NaOH or with sodium methoxide in methanol to a solution pH of 7.0. The methanolic solutions of the polymers were then evaporated to dryness under vacuum to isolate the sodium salts of the sulfonated polymers. Analytical data are presented in Table II.

EXAMPLE 4

Solution Rheology

To evaluate the rheological properties of aqueous solutions of these block polymers, the polymers were first dissolved in doubly distilled water at an initial concentration of 2500 ppm under mild agitation conditions (magnetic stirrer) at room temperature. Generally, dissolution of the polymers was complete after 24 hours of agitation. Solutions at lower polymer concentrations were obtained by dilation of these concentrates with distilled water.

The rheology in terms of a viscosity-shear rate profile was obtained using a Contraves LS-30 Couette viscometer. The shear rates investigated were from 0.02 to 120 $sec^{-1}$. Due to the high viscosity of some solutions, the lower shear rates ($<1$ $sec^{-1}$) were not obtained due to shear stress limitations of the instrument. Since most of the samples exhibited psuedoplastic behavior, it was important to determine viscosity as a function of shear rate in order to make valid comparisons between polymer structure and solution properties.

Figure 4:
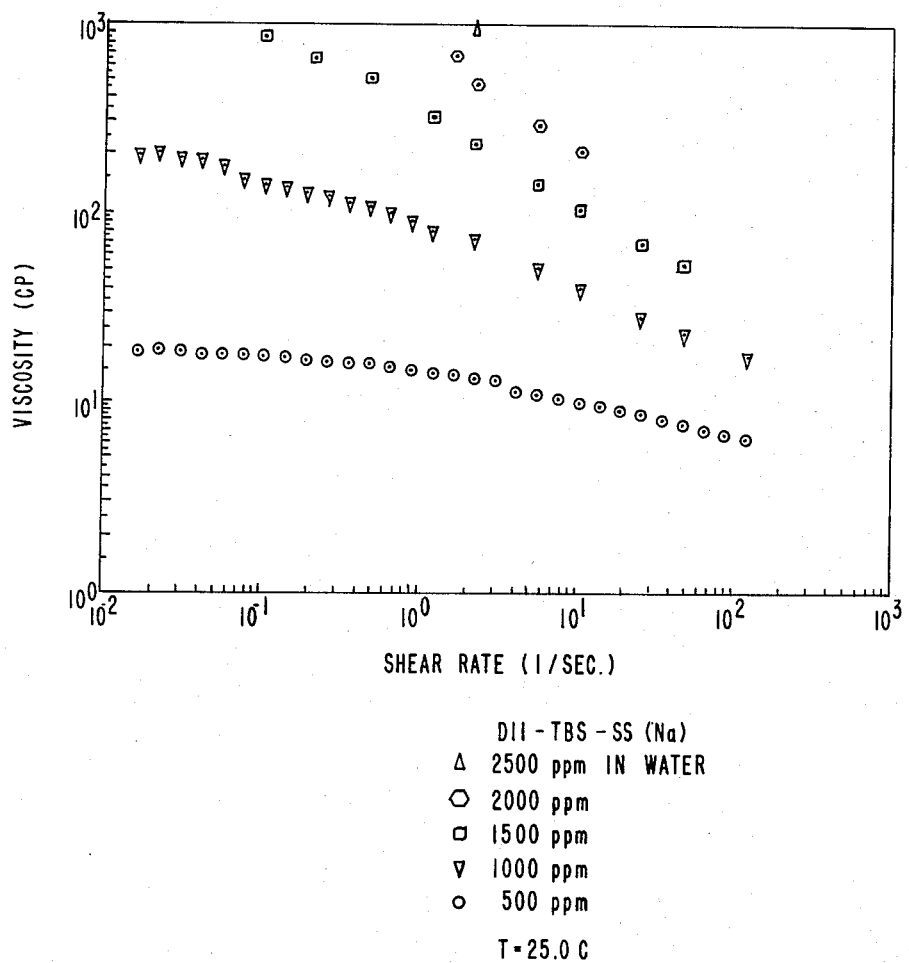
FIG. 4 illustrates a plot of viscosity versus shear rate for a sulfonated diblock polymer having 11 wt. % hydrophobe.

The curves of viscosity as a function of shear rate for D11-TBS-SS in distilled water are given in FIG. 4 at concentrations from 500 to 2500 ppm in increments of 500 ppm. As can be observed from these data, at or above 1500 ppm the log-log plots show a linear decrease in viscosity over the shear rate range measured. This pseudoplastic behavior can thus be represented by a simple power law relationship. At concentrations of 1000 ppm and below, a Newtonian or shear rate independent viscosity can be determined at low shear rates. This so called zero shear viscosity can be used to construct reduced viscosity-concentration plots providing information on the hydrodynamic volume of the polymer in solution. This will be discussed in Example 5.

In order to examine the effect of structural parameters of the block polymers on solution rheology, two additional polymers were prepared. One was diblock polymer (D5-TBS-SS) containing 3.3 mole % t-butylstyrene and 96.7 mol % of styrene sulfonate with a weight average molecular weight of $9.0 \times 10^5$. This resulted in the polymer containing approximately 163 t-butylstyrene units and 4750 styrene sulfonate units. The other polymer was a triblock polymer (T5-TBS-SS) of $10.5 \times 10^5$ molecular weight which consisted of a midblock of 96.7 mole % styrene sulfonate and two equal end blocks of 1.65 mole %. The styrene sulfonate block consisted of 5570 monomer units while the t-butylstyrene endblocks were of 95 units each.

Figure 5:
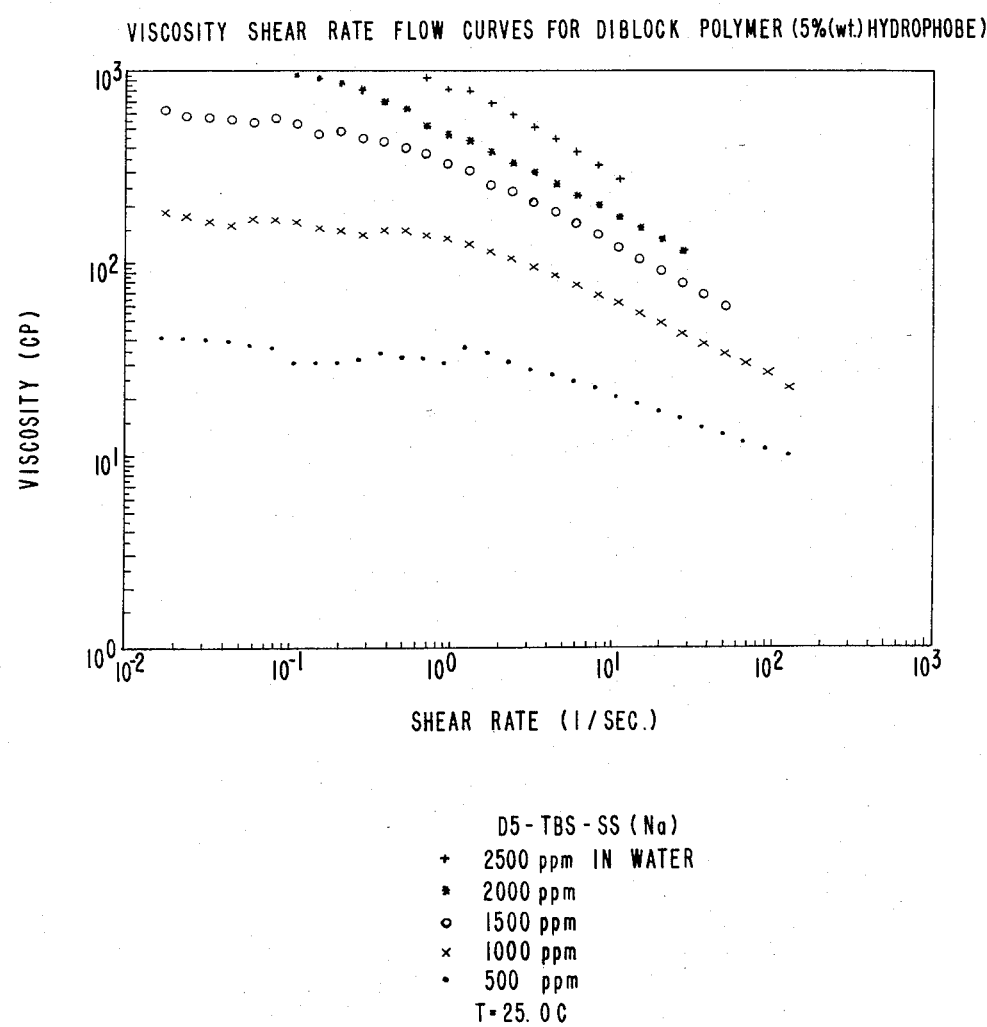
FIG. 5 illustrates a plot of viscosity versus shear rate for a sulfonated diblock polymer having 5 wt. % hydrophobe.
Figure 6:
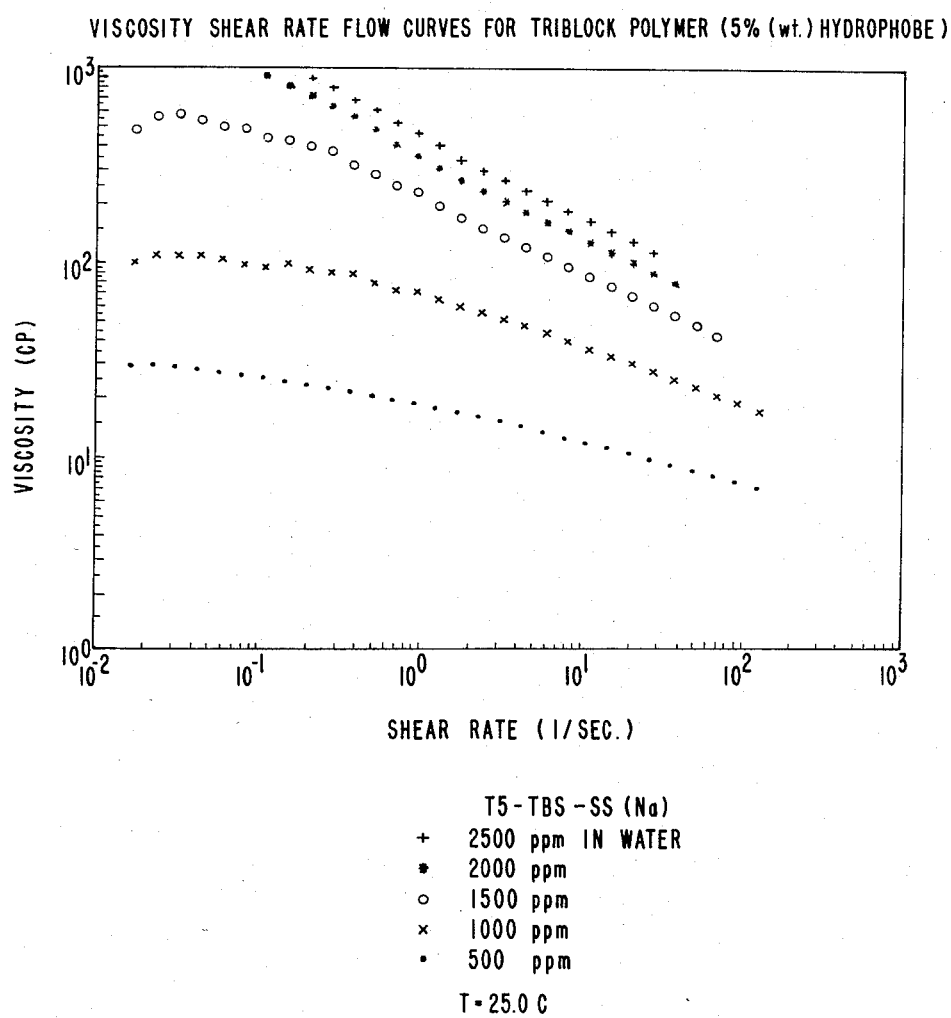
FIG. 6 illustrates a plot of viscosity versus shear rate for a sulfonated triblock polymer having 5 wt. % hydrophobe.

The rheological data for the diblock and triblock polymers are presented in log-log plots of viscosity versus shear rate in FIGS. 5 and 6. The diblock polymer, D5-TBS-SS, in aqueous solution has a higher viscosity at low concentration (500 ppm) than D11-TBS-SS, the diblock of higher t-butylstyrene content. This may be due to the greater molecular weight of diblock, D5-TBS-SS relative to D11-TBS-SS as seen in Table I. The observation of lower viscosity, at 1000 ppm and greater for D5-TBS-SS, could be a result of decreased polymer association due to the smaller t-butylstyrene block length.

The data in FIG. 6 for the triblock polymer, T5-TBS-SS, showed that this polymer had lower viscosity than the comparable diblock over the concentration range investigated even though its molecular weight was some 20% greater than that of diblock (see Table I). The viscosity levels exhibited by the triblock polymer in aqueous solution, again indicates that aggregation of polymer molecules was occuring. However, the extent and/or type of association appears to be different than the diblock polymers.

EXAMPLE 5

Comparison With Random Copolymers and Homopolymers

Figure 7:
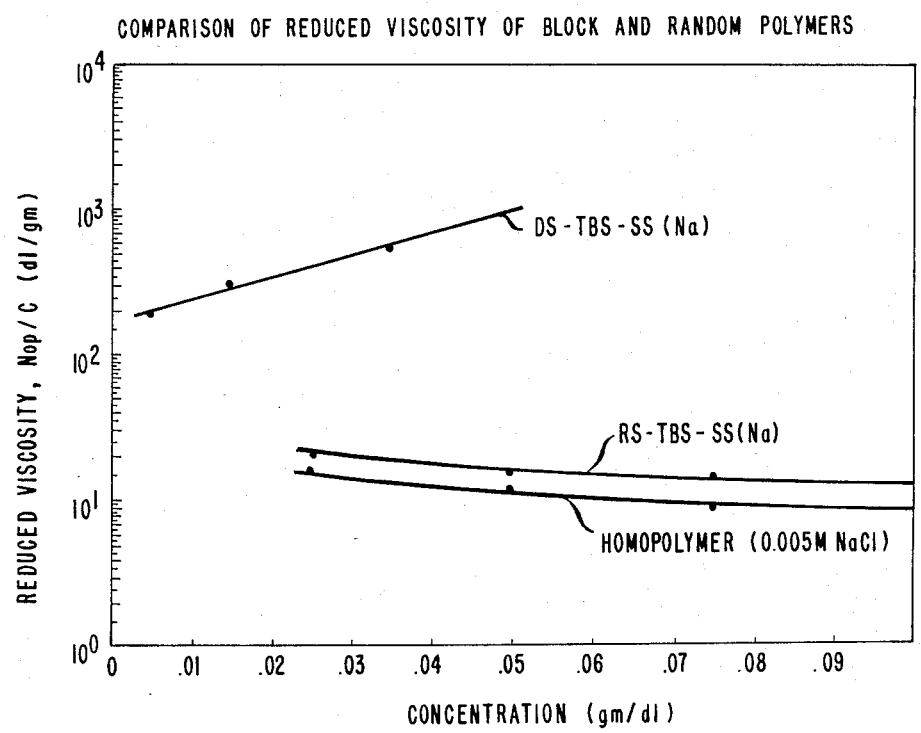
FIG. 7 illustrates a comparison of reduced viscosity of block and random polymer by a plot of reduced viscosity versus concentration.

A comparison of the reduced viscosity as a function of polymer concentration for the block polymer, D5-TBS-SS, and random copolymer, R5-TBS-SS, of the same composition is shown in FIG. 7. Both polymers had a t-butylstyrene content of 5 wt% (3.3 mole %) with a $M_w$ for the block polymer of $9.0 \times 10^5$ and $8.3 \times 10^5$ for the random copolymer. As can be readily seen from the plots in FIG. 7, the random polymer solution behavior was quite different than that for the corresponding block polymer. The most striking difference is that the block polymer solution intrinsic viscosity is some 30 to 40 times greater than that for the random polymer. Also the reduced viscosity curve for R5-TBS-SS was more closely related to that for a homopolystyrene sulfonate of $M_w = 6.5 \times 10^5$. The random copolymer had slightly higher solution viscosity which could have been due to its higher molecular weight and that the homopolymer solution contained salt (0.005M NaCl) compared to the pure water medium for R5-TBS-SS.

TABLE I

| | Copolymer Compositional Data | | | | | |
|---|---|---|---|---|---|---|
| | Composition, wt. % (Mole %) | | | Molecular Weight | | |
| | Block | | | | | |
| Polymer | t-Butylstyrene | Styrene | t-Butylstyrene | $M_w \times 10^5$ | $M_n \times 10^5$ | $M_z \times 10^5$ |
| D5-TBS-S1 | 5(3.3) | 95(96.7) | — | 1.4 | 1.3 | 1.4 |
| D5-TBS-S2 | 5(3.3) | 95(96.7) | — | 2.8 | 2.7 | 2.9 |
| D5-TBS-S3 | 5(3.3) | 95(96.7) | — | 5.2 | 4.9 | 5.5 |
| D5-TBS-S4 | 5(3.3) | 95(96.7) | — | 7.2 | 6.9 | 7.7 |
| D5-TBS-S5 | 5(3.3) | 95(96.7) | — | 10 | 9.4 | 1.1 |
| D11-TBS-S | 11(7.4) | 89(92.6) | — | 4.7 | 4.4 | 4.9 |
| T5-TBS-S | 2.5(1.65) | 95(96.7) | 2.5(1.65) | 6.1 | 5.7 | 6.4 |
| RANDOM | | | | | | |
| R5-TBS-S | 5(3.3) | 95(96.7) | | 4.8 | 4.6 | 5.2 |
| R10-TBS-S | 10(6.7) | 90(93.3) | | 5.0 | 4.6 | 5.2 |

TABLE II

| MOLECULAR WEIGHT AND ELEMENTAL ANALYSES OF SULFONATED POLYMERS | | | | | |
|---|---|---|---|---|---|
| | Molecular | Elemental Analyses | | | |
| | Weight | Calc. | | Found | | Sulfonation |
| POLYMER | $M_w \times 10^{-5}$ | S | Na | S | Na | Extent[a] |
| D5-TBS-SS1 | 2.4 | 15.13 | 10.88 | 16.16 | 10.1 | 1.06 |
| D5-TBS-SS2 | 4.7 | 15.13 | 10.88 | 13.78 | 9.54 | 0.91 |
| D5-TBS-SS3 | 9.0 | 15.13 | 10.88 | 15.47 | 10.4 | 1.02 |
| D5-TBS-SS4 | 12 | 15.13 | 10.88 | 12.58 | 8.19 | 0.83 |
| D5-TBS-SS5 | 17 | 15.13 | 10.88 | 12.88 | 9.11 | 0.85 |
| R5-TBS-SS | 8.3 | 15.13 | 10.88 | 15.79 | 10.6 | 1.04 |
| R10-TBS-SS | 8.5 | 14.71 | 10.57 | 14.20 | 1.5 | 0.96 |

[a]Sulfonation extent. S(Found)/S(calc.), is a measure of sulfonate groups per styrene unit.

What is claimed is:

1. A water soluble diblock polymer having the formula:

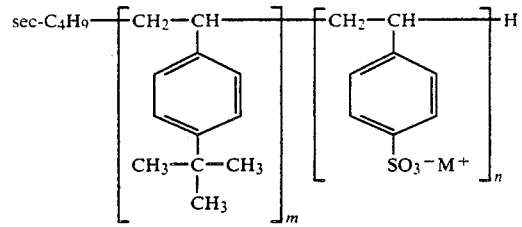

wherein m is about 0.5 to about 15.0 mole %, n is about 85.0 to about 99.5 mole %, and M is selected from the group consisting of hydrogen, and metal ions of iron, aluminum, lead, and Groups IA, IIA, IB and IIB of the Periodic Table of Elements.

2. A diblock polymer according to claim 1 wherein M is sodium.

3. A diblock polymer according to claim 1 which is water soluble.

4. A diblock polymer according to claim 1 said diblock polymer being dissolved in water to form a solution, said solution having a viscosity of about 5 cP to about 1000 cP at a concentration level of about 0.005 to about 5.0 grams of said diblock polymer per 100 grams of water.

5. A water soluble triblock polymer having the formula:

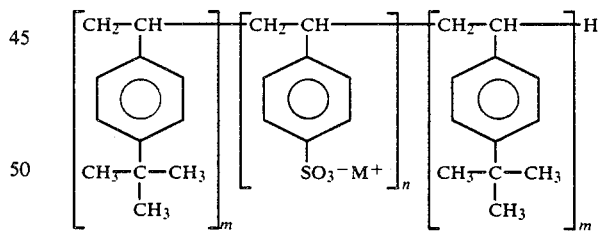

wherein m is about 0.25 to about 7.5 mole %, n is about 85.0 to about 99.5 mole %, and M is selected from the group consisting of hydrogen, and metal ions of iron, aluminum, lead, and Groups IA, IIA, IB and IIB of the Periodic Table of Elements.

6. A triblock polymer according to claim 5 wherein M is sodium.

7. A triblock polymer according to claim 5 which is water soluble.

8. A triblock polymer according to claim 5, said triblock polymer being dissolved in water to form a solution, said solution having a viscosity of about 5 cP to about 1000 cP at a concentration level of about 0.005 to about 5 grams of said triblock polymer per 100 grams of water.

* * * * *